United States Patent
Gerweck

(10) Patent No.: US 12,174,834 B2
(45) Date of Patent: Dec. 24, 2024

(54) DATACUBE ACCESS CONNECTORS

(71) Applicant: AtScale, Inc., San Mateo, CA (US)

(72) Inventor: Sarah Gerweck, San Mateo, CA (US)

(73) Assignee: AtScale, Inc., Boston, MA (US)

( * ) Notice: Subject to any disclaimer, the term of this patent is extended or adjusted under 35 U.S.C. 154(b) by 0 days.

(21) Appl. No.: 17/368,937

(22) Filed: Jul. 7, 2021

(65) Prior Publication Data

US 2022/0012238 A1  Jan. 13, 2022

Related U.S. Application Data

(60) Provisional application No. 63/049,047, filed on Jul. 7, 2020.

(51) Int. Cl.
  *G06F 16/30* (2019.01)
  *G06F 16/242* (2019.01)
  *G06F 16/2455* (2019.01)
  *G06F 16/27* (2019.01)

(52) U.S. Cl.
  CPC ...... *G06F 16/2455* (2019.01); *G06F 16/2425* (2019.01); *G06F 16/27* (2019.01)

(58) Field of Classification Search
  CPC ....... G06F 16/27; G06F 16/2455; G06F 16/25
  See application file for complete search history.

(56) References Cited

U.S. PATENT DOCUMENTS

| | | | |
|---|---|---|---|
| 10,649,962 B1* | 5/2020 | Wilton | G06F 16/1734 |
| 2002/0129145 A1* | 9/2002 | Chow | H04L 67/563 |
| | | | 709/225 |
| 2007/0198471 A1* | 8/2007 | Schneider | G06F 16/256 |
| 2009/0234799 A1* | 9/2009 | Betawadkar-Norwood | |
| | | | G06F 16/2471 |
| 2015/0112967 A1* | 4/2015 | Shimizu | G06F 16/2455 |
| | | | 707/718 |
| 2016/0171050 A1* | 6/2016 | Das | G06F 16/90332 |
| | | | 707/718 |
| 2019/0220464 A1* | 7/2019 | Butani | G06F 16/24542 |

* cited by examiner

*Primary Examiner* — Khanh B Pham
(74) *Attorney, Agent, or Firm* — Armis IP Law, LLC

(57) ABSTRACT

A multidimensional database query engine processes a query request by forming a logical plan of subqueries for retrieving and assembling the data called for by the query request. A multidimensional database connector is invoked to transform a logical plan that defines and orders each subquery into a physical plan for accessing the data repositories where the data satisfying the query is stored. The query engine is invoked or called by an application and receives a query plan indicative of data repositories interrogated by query instructions in the query plan. For each data repository of the plurality of data repositories that may be interrogated by the query plan, a connector is defined based on commands for accessing each data repository. The connector associates each query instruction from the query plan with a corresponding repository command for accessing the data repository.

13 Claims, 3 Drawing Sheets

DATACUBE ACCESS CONNECTORS

RELATED APPLICATIONS

This patent application claims the benefit under 35 U.S.C. § 119(e) of U.S. Provisional Patent App. No. 63/049,047, filed Jul. 7, 2020, entitled "DATACUBE ACCESS CONNECTORS," incorporated herein by reference in entirety.

BACKGROUND

Multidimensional databases evolved from conventional relational databases by extending the notion of a two dimensional "table" of tabular information into a datacube arrangement having a plurality of dimensions bounded only by available processor and memory capabilities. Multidimensional databases allow for more complex queries, and have evolved to relieve the user of knowing the physical location of the data sought by the multidimensional query. Accordingly, the logical notion of a single multidimensional database, often referred to as a datacube, typically references at least several physical data repositories, or storage locations, of the data stored therein. The multidimensional database therefore provides a query operator with a single view of a database which may invoke many physical data stores, and data arrangements therein (tables, lists, unstructured collections, etc.) for accessing data to satisfy a query request.

SUMMARY

A multidimensional database query engine processes a query request by forming a logical plan of subqueries for retrieving and assembling the data called for by the query request. A multidimensional database connector is invoked to transform a logical plan that defines and orders each subquery into a physical plan for accessing the data repositories where the data satisfying the query is stored. The query engine is invoked or called by an application and receives a query plan indicative of data repositories interrogated by query instructions in the query plan. For each data repository of the plurality of data repositories that may be interrogated by the query plan, a connector is defined based on commands for accessing each data repository. The connector associates each query instruction from the query plan with a corresponding repository command for accessing the data repository, in effect providing a transformation from the logical query instruction in the query plan into a repository command for accessing and retrieving the sought data items from the physical data repository where the data is stored.

Configurations herein are based, in part, on the observation that many physical data repositories may be invoked to satisfy the query request to the datacube. The query plan typically includes a plurality of subqueries, such that each subquery in the plurality of subqueries accesses at least one data repository. Unfortunately, conventional approaches to data retrieval suffer from the shortcoming that the physical data repositories employ different access commands and instructions for physical data retrieval. Data instructions called for by the query plan may not apply universally to each data repository. Accordingly, configurations herein substantially overcome the shortcomings of conventional access by providing a transformation or mapping of, for each data repository, query instructions to repository commands called for by the subqueries. In this manner, the query plan defines a logical representation of query instructions for satisfying the query request, and the data repository-specific connector receives and applies the general query instructions into data repository-specific commands for accessing the particular data repository. A registry of available connectors provides an interface to available data connectors for assimilating into the planned query for invoking the appropriate connector for each data repository interrogated by the query request.

Upon receiving a query request, the query engine generates a logical query plan depicting data entities and operations for satisfying the query request in a hierarchical manner based on dependencies and operations between data entities, described further in copending U.S. patent application No. 63/049,046, entitled "DATACUBE QUERY PLANNING." The logical query plan defines a hierarchical ordering of accesses and operations of subqueries needed to fulfill the query request. The subqueries employ general logic and values for effecting the subquery.

Each subquery defines an access to one or more physical data repositories. However, each data repository imposes its own set of rules and access commands for retrieval of data therein. Accordingly, the connector defines a transformation or mapping from the query instructions in the subquery to the repository commands expected by the particular data repository.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In general, each physical data repository includes one or more fact tables responsive to the repository commands for retrieving data items stored in the fact table for satisfying the subquery accessing the data repository. Fact tables are complemented by index tables that define various dimensions of the database. Ultimately, the retrieved data emanates from the fact tables, while the index tables may be employed by the various repository commands transformed by the connector.

Each connector launches and executes in an isolated machine space, such that, for each established connector, query instructions and associated repository commands remain isolated from the query instructions and associated repository commands of the other connectors established for the plurality of data repositories. Since the connector invokes any libraries and runtime structures needed to perform the repository commands, isolation from other connectors ensures that differing or incompatible versions of libraries, packages and any supporting code or instructions do not interfere with each other.

Figure 1:
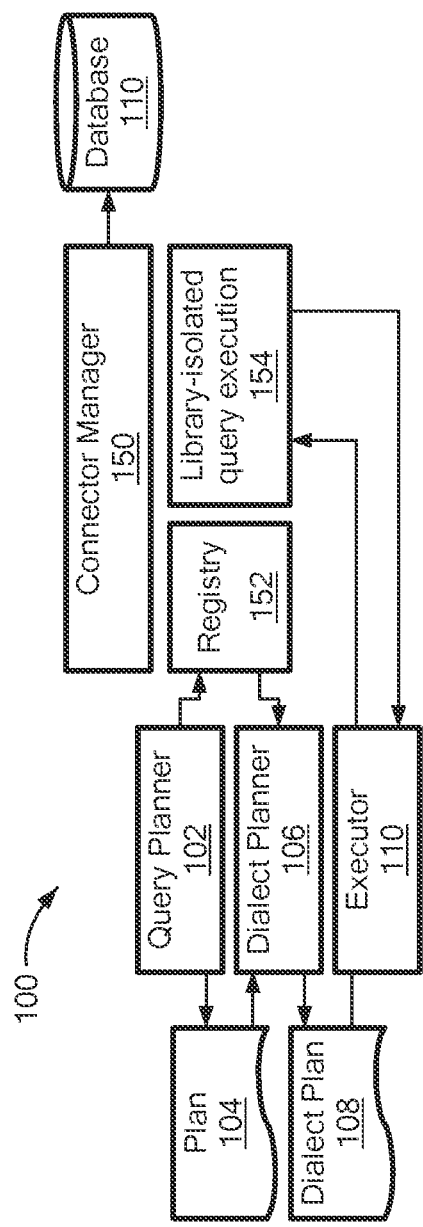
FIG. 1 is a context diagram of the connectors in conjunction with a multidimensional database.

FIG. 1 is a context diagram of the connectors in conjunction with a multidimensional database. Referring to FIG. 1, based on the data repositories called for by the query plan, connectors are registered by a connection manager 150, which receives an identification of the connectors required by the subqueries called for by the query plan and stores an entry in a registry 152 for each connector. The connector manager 150 identifies a storage location for access by each of the connectors, typically a database 110, and loads, prior to execution of the respective subquery, the connectors from the respective identified storage location.

In operation of the query engine 100, continuing with FIG. 1, the query planner 102 generates a plan 104 that includes a plurality of subqueries, such that each subquery in the plurality of subqueries accesses at least one data repository in a database 110 using a mapping of, for each data repository, query instructions to repository commands called for by the subqueries.

Each subquery in the plurality of subqueries includes a plurality of query instructions. The query planner 102 forms the query plan 104 by generating a set of subqueries based on dependencies between data items sought by the query and an ordering of query operations. Generated subqueries in the query plan are arranged to defining a sequence and dependence between the generated subqueries.

A dialect planner 106 selects repository commands understood by the database, and identifies, for each query instruction, a corresponding repository command for accessing the data repository (database) 110. A resulting dialect plan 108 includes the repository specific commands (repository commands) recognized by the data repository.

An executor 110 invokes the connector from a subquery of the plurality of subqueries, and accesses code or libraries 154 for execution of the repository commands. The executor 110 launches or instantiates a set of instructions based on the accessed code or libraries for performing the repository commands in a noninterfering manner with other invoked connectors. In this manner, the connector manager 150 isolates each connector from incompatibilities or interference from other connectors. For example, different repositories may employ certain versions of Oracle® database managers. In the event different Oracle database managers are incompatible, comingled access to different repositories could otherwise conflict.

In sum, the query request decomposes into subqueries, each which access one or more data repositories. Each data repository has a connector. The subqueries invoke a connector for each repository needed, in isolation from other subqueries. Thus, each permutation of a data repository accessed by a subquery triggers an isolated instance of a connector.

Figure 2:
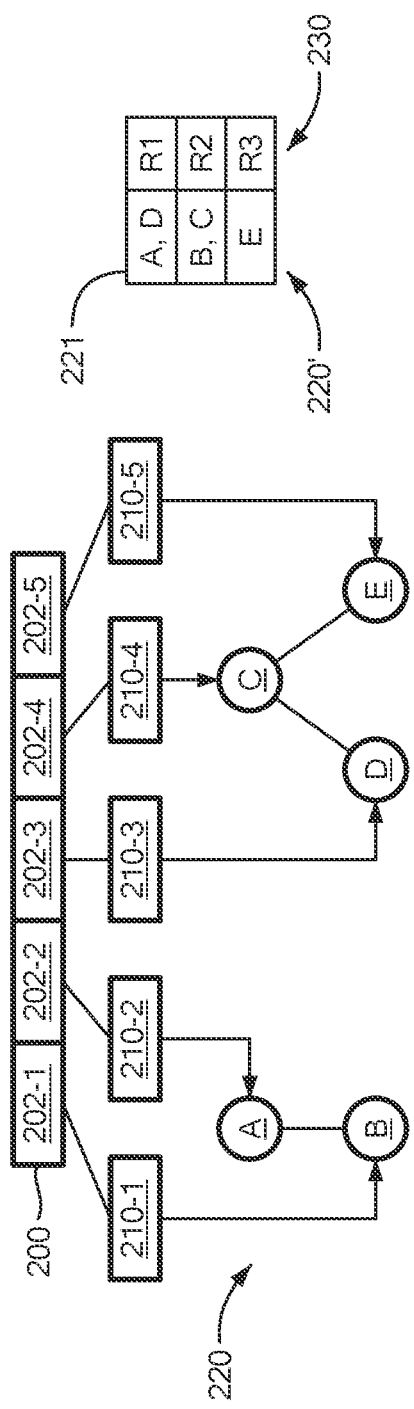
FIG. 2 shows a query separated into portions defining subqueries for accessing the multidimensional database as in FIG. 1.

FIG. 2 shows a query separated into portions defining subqueries for accessing the multidimensional database as in FIG. 1. Referring to FIGS. 1 and 2, a query 200 emanates from an application on behalf of a user or requestor of the multidimensional database 110, or datacube, typically over a network from a user interface. A query is an expression denoting a information sought from the database, such as an SQL query, and includes values and conditional statements about the data sought. Most often this is in the form of fields from one or more records that satisfy the conditional statements in the query.

Each query 200 includes one or more portions 202-1 . . . 202-5 (202 generally) that call out or reference a specific subset of the query, such as a field or record from table. Typically, a field is a value defined by a column in a table, which has rows or records each containing a number of fields for each row, or record, in the table. The tables containing data denote fact tables, and are referenced by one or more indices, or index tables, which contain pointers to the data table and facilitate access, discussed further below.

Each portion 202 defines a subquery 210-1 . . . 210-5 (210 generally) that can be executed towards a table or set of tables. Different subqueries may reference different tables or databases. Since some expressions in the query 200 may express conditionals of other expressions or values in the query, dependencies form between the subqueries. The plan 104 denotes a logical plan that identifies the subqueries 210 and execution dependencies in a tree mapping 220. Since each subquery 210 access only a subset of the values sought to satisfy the entire query 200, different subqueries may need invoke different physical data repositories.

Each subquery 210, therefore, may be associated to a physical repository containing the table or tables needed for that particular subquery. Accordingly, the query planner 102 may define a mapping 221 that denotes which repositories R1 . . . R3 contain the data sought by the respective subqueries 220'. Each subquery 210 invokes a connector specific to the repository R1 . . . R3 (230) it needs to access.

Each connector is distributed as a package or archive. A package contains all the items required to describe the connector as well as any libraries and code necessary for its function. This could be a folder on disk, an archive, a compressed stream of data, or any other mechanism that can combine multiple pieces of data.

Figure 3:
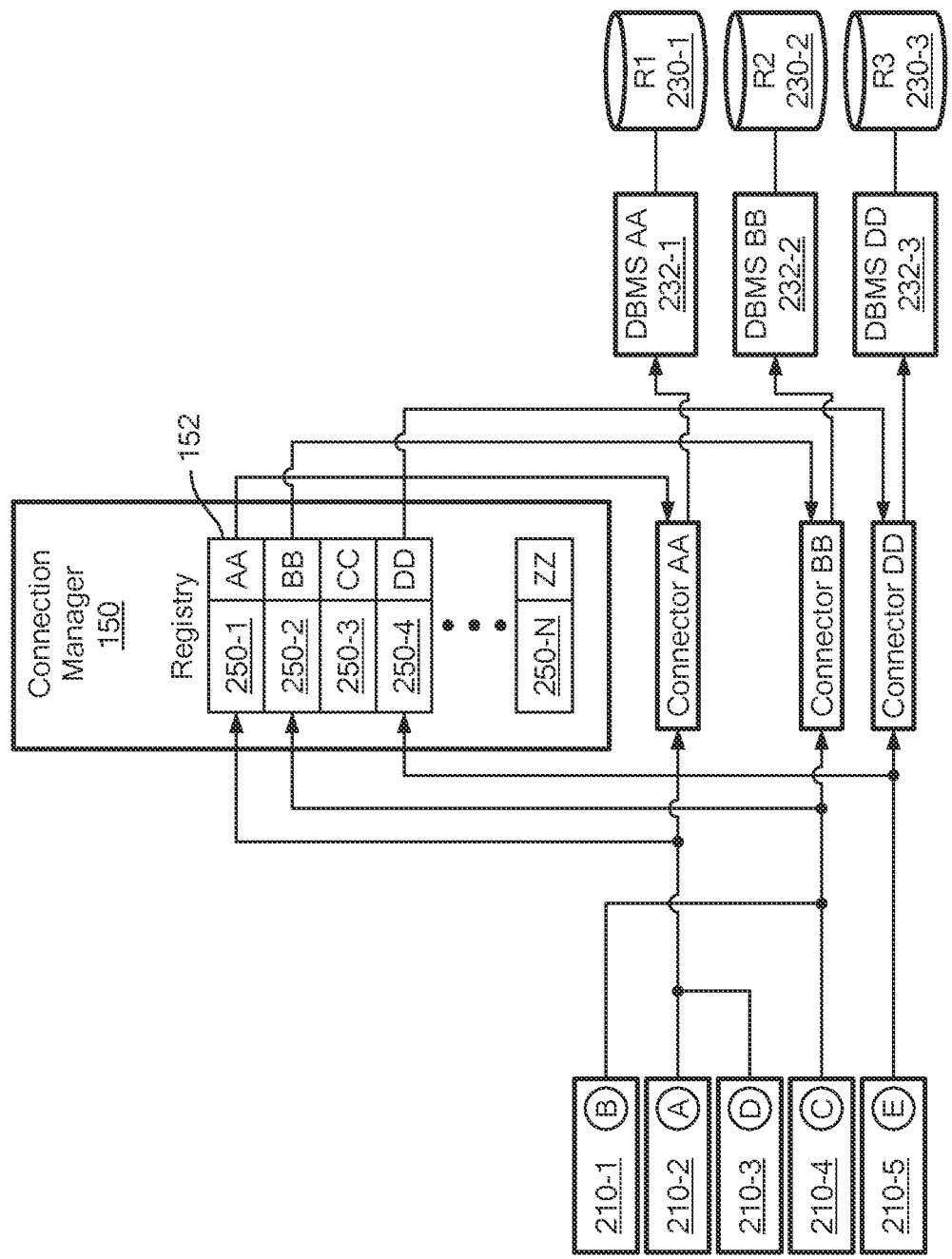
FIG. 3 shows a data flow diagram of the query portions accessing the data repositories according to the subqueries of FIG. 2.

FIG. 3 shows a data flow diagram of the query portions accessing the data repositories according to the subqueries of FIG. 2. The connection manager 150 handles the association of each subquery 210 with mapping to the corresponding repository 230. Registration and loading refer to the provisioning of a subquery 210 with the connector needed to access the respective repository.

Registration & loading may include the following. The application establishes an extension location, which could be a file system, a database, a network store, a cloud bucket, or other suitable storage medium. A user drops in the connector package(s) they want to allow for their use cases. At application startup, the application loads any extensions that are installed. After discovery or an explicit load, the connector provides metadata that identifies the connector so it can be registered. Such metadata might include a display name, programmatic identifier, configuration data, a description of its capabilities, instructions, a reference, or a dynamic link to create the connector object.

A registry 152 stores available connectors 250-1 . . . 250-N (250 generally) which define the repository commands for accessing the respective repository 230-1 . . . 230-3 (230 generally). Since the connector 250 performs a transformation from the generic database commands and symbols from the query 200 to repository specific commands, the registry 152 includes a connector 250 corresponding to each repository 230.

The connection manager 150 performs a lookup, index or similar reference to the registry to identify the connector 250 corresponding to the repository 230 which the subquery 210 needs to access. The referenced connector 250 is invoked for transformation with a DBMS (Database Management System) 232-1 . . . 232-3 (232 generally) or similar commend interpreter for each respective repository 230. The connector mapping may also include launching an executable set of instructions for performing the subquery.

The connector's registration includes the instructions required to provide the following major connector functions: transformation of query plans, (optionally) a recipe or function for the conversion of plans to text or other serial representation, and a class, template, builder or other procedure for generating a mechanism for the execution of a query plan on the respective repository 230. Transformation refers to a mapping of the generic commands or expressions from the query 200 to the repository specific equivalent, discussed further in FIG. 4.

In simplest terms the connector 250 performs a translation between the commands, expressions and other syntax employed in the generic query 200 received from the application to an equivalent command or syntactical expression understood by the specific repository 230 needed to satisfy the subquery 210. The connector 250 is therefore responsible for describing plan transformations. The application that uses the connector system provides an inbound query plan based on a generic or reference implementation. This will include logical/structural constructs, which might describe queries against relations, objects, graph, documents or other structures. An example might be a union, join or projection over data. The connector 250 will also address functional constructs, which include both scalar and vectorial functions. An example might include arithmetic, the extraction of a pattern from a string, the determinant of a matrix, the size of a set, etc.

The connector might also provide a set of rules for the transformation of a plan from this generic format to a format suitable for the specific data source to which the subquery needs to connect. For example, this might be based on pattern matching, where a pattern description describes how to find a sub-trees within a plan's tree structure to transform it. Also, the query plan is not strictly required to be a tree representation—it could have an arbitrary structure—however trees are most common. A logical example might be to reformulate Boolean-typed values into logical manipulations on integer types. A functional example might be to transform a reference format for template strings to the template format required by the data store.

It should be noted that the above example depicts a query 200 in a SQL text, or readable form. Many data storage mechanisms use query systems based on a textual representation, e.g., SQL, MDX, XQuery, XPath, GraphQL. Optionally, the connector 250 may include a mechanism to convert a transformed plan into a textual representation for easier understanding or manipulation.

Figure 4:
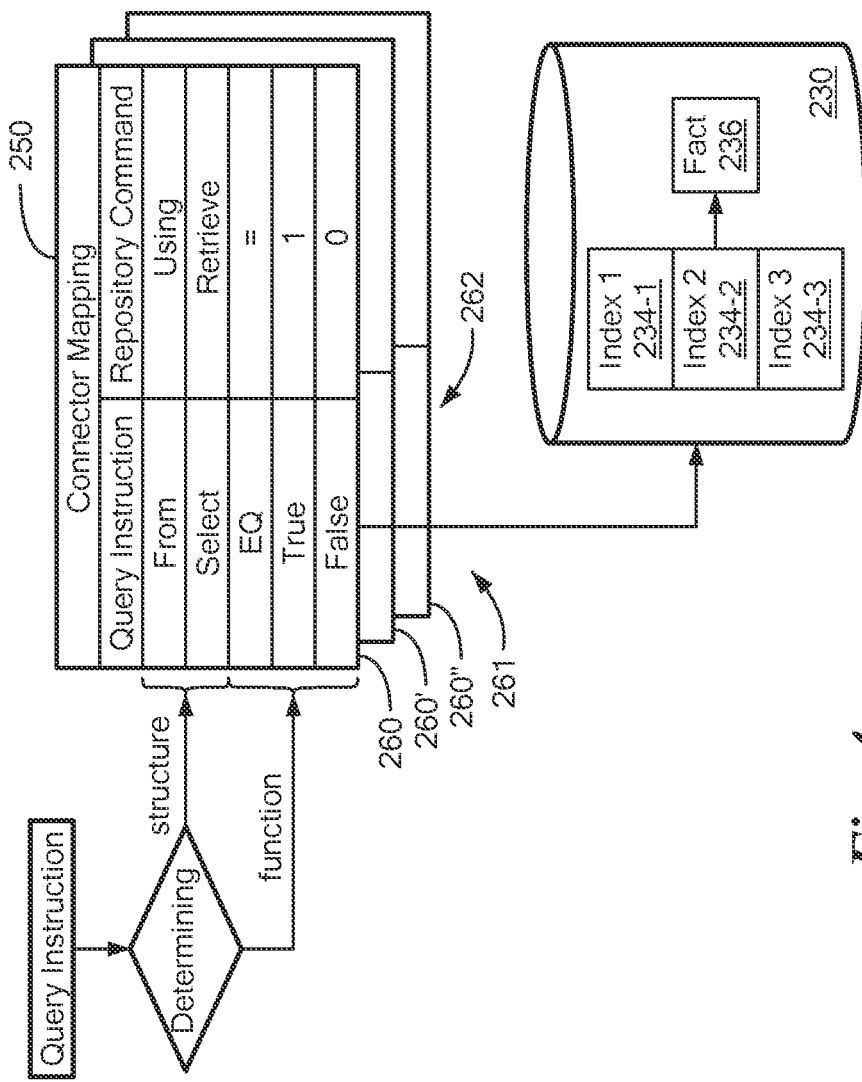
FIG. 4 shows a detailed view of a database connector as employed in FIG. 3.

FIG. 4 shows a detailed view of a database connector as employed in FIG. 3. The connector 250 contains a mechanism that allows for the execution of the query plan. Per the above, the plan might be provided to the execution mechanism as either a rich data structure or text. If both are supported, metadata in the connector should describe whether to use a rich structure or serialized text. In the example configuration, the connector returns a function, object or other structure that contains the instructions necessary to provision a connection (or other execution mechanism). The connection or execution mechanism has the following abilities: Execute a plan, either in the form of a data structure or text; Receive results or target them for storage somewhere; and optionally track the status of or cancel an execution. The connector 250 may also provide additional metadata or reporting information about execution progress, cost, or other metrics.

Referring to FIGS. 2-4, once registered as shown in FIG. 3, the connector 250 receives one or more query instructions defined in the subquery 210 for execution. The connector 250 employs a mapping table 260 to perform a mapping from a query instruction 261 to a corresponding repository command 262 recognized by the particular repository 230 to which the subquery 210 is directed. The connector framework could include a mechanism to allow the connector to use libraries or other resources that it requires. An isolation system might be employed so as to allow several connectors to coexist, even if they require conflicting libraries or different versions of the same library. Therefore, each connector 250 operates with the mapping table 260' in its own address space such that it does conflict with another connector's mappring table 260". The mapped repository commands 262 are invoked with respect to the repository 230, and generally access one or more index tables 234-1 . . . 234-N (234 generally) for referencing a fact table 236.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In a datacube environment having a plurality of dimensions indicative of facts, a method for accessing data in fact tables, comprising:
   receiving a query plan, the query plan indicative of a plurality of data repositories interrogated by query instructions in the query plan, each data repository of the plurality of data repositories responsive to a set of repository commands different from a set of repository commands recognized by the other data repositories of the plurality of data repositories, and each data repository containing at least one field not found in the other data repositories of the plurality of data repositories;
   establishing, for each data repository interrogated by the query plan, a connector based on the set of repository commands recognized for accessing each respective data repository of the plurality of data repositories, the connector specific to the accessed repository for associating a query instruction from the query plan with a corresponding repository command for accessing the data repository, the query plan including a plurality of subqueries, each subquery in the plurality of subqueries accessing at least one data repository using the respective connector for the accessed repository for mapping the query instruction to the corresponding repository command called for by the subquery, the respective connector established after determining the data repository based on the subquery;
   isolating, for each established connector, query instructions and associated repository commands from the query instructions and associated repository commands of the other connectors established for the plurality of data repositories, each subquery in the plurality of subqueries including at least one query instruction;
   computing, for each of the query instructions in the query plan, a corresponding repository command based on invoking the connector for performing the mapping of the query instruction to the associated repository command; and
   executing each corresponding repository command, for each of the query instructions in the query plan, the corresponding repository command for accessing the data repository based on the mapping.

2. The method of claim 1 wherein the data repository includes one or more fact tables, the fact tables responsive to the repository commands for retrieving data items stored in the fact table for satisfying the subquery accessing the data repository.

3. The method of claim 1 further comprising generating the query plan by:
generating a set of subqueries based on dependencies between data items sought by the query and an ordering of query operations; and
ordering the generated subqueries in the query plan for defining a sequence and dependence between the generated subqueries.

4. The method of claim 1 further comprising:
invoking the connector from a subquery of the plurality of subqueries;
accessing code or libraries for execution of the repository commands; and
instantiating a set of instructions based on the accessed code or libraries for performing the repository commands in a noninterfering manner with other invoked connectors.

5. The method of claim 1 further comprising registering the connectors by:
receiving an identification of the connectors required by the subqueries called for by the query plan;
identifying a storage location for access by each of the connectors; and
loading, prior to execution of a query plan, the connectors for accessing the respective identified storage location.

6. The method of claim 1 further comprising rendering a textual representation of the repository command identified from the query instruction.

7. The method of claim 1 further comprising mapping the query instruction from the subquery to a repository instruction recognized by the data repository.

8. The method of claim 7 wherein the mapping further comprising launching an executable set of instructions for performing the subquery.

9. The method of claim 1 further comprising establishing the connector based on a set of query instructions defining the subqueries and a corresponding set of repository commands specific to a data repository of the plurality of data repositories.

10. A data structure for, in a datacube environment having a plurality of dimensions indicative of facts, accessing data in fact tables, comprising:
a query plan having query instructions, the query plan indicative of a plurality of data repositories interrogated by the query instructions in the query plan, each data repository of the plurality of data repositories responsive to a set of repository commands different from a set of repository commands recognized by the other data repositories of the plurality of data repositories, and each data repository containing at least one field not found in the other data repositories of the plurality of data repositories, the query plan including a plurality of subqueries, each subquery in the plurality of subqueries accessing at least one data repository of the plurality of data repositories using a respective connector specific to the accessed data repository for mapping a query instruction to a corresponding repository command called for by the subquery; and
a registry for storing, for each data repository of the plurality of data repositories interrogated by the query plan, the connector specific to the respective data repository, the connector based on commands for accessing each data repository of the plurality of data repositories, the connector associating the respective query instructions from the query plan with the corresponding repository command of the set of repository commands for accessing the data repository,
the connector specific to a data repository of the plurality of data repositories and configured for isolating, for each established connector, query instructions and associated repository commands from the query instructions and associated repository commands from the other connectors established for the plurality of data repositories, the respective connector established after determining the data repository based on the subquery, each subquery in the plurality of subqueries including at least one query instruction, the connector including a mapping to identify, for the query instruction, a corresponding repository command for accessing the data repository,
the registry configured for invoking each respective connector for;
computing, for each of the query instructions in the query plan, the corresponding repository command based on invoking the connector for performing the mapping of the query instruction to the associated repository command; and
executing each corresponding repository command for accessing the data repository based on the mapping.

11. The data structure of claim 10 wherein the data repository includes one or more fact tables, the fact tables responsive to the repository commands for retrieving data items stored in the fact table for satisfying the subquery accessing the data repository.

12. The data structure of claim 10 wherein query plan is responsive to:
generating a set of subqueries based on dependencies between data items sought by the query and an ordering of query operations; and
ordering the generated subqueries in the query plan for defining a sequence and dependence between the generated subqueries.

13. A computer program embodying program code on a non-transitory medium that, when executed by a processor, performs steps for implementing a method for, in a datacube environment having a plurality of dimensions indicative of facts, a method for accessing data in fact tables, the method comprising:
receiving a query plan, the query plan indicative of a plurality of data repositories interrogated by query instructions in the query plan, each data repository of the plurality of data repositories responsive to a set of repository commands different from a set of repository commands recognized by the other data repositories of the plurality of data repositories, and each data repository containing at least one field not found in the other data repositories of the plurality of data repositories;
establishing, for each data repository interrogated by the query plan, a connector based on the set of repository commands recognized for accessing each respective data repository of the plurality of data repositories, the connector specific to the accessed repository for associating a query instruction from the query plan with a corresponding repository command for accessing the data repository, the query plan including a plurality of subqueries, each subquery in the plurality of subqueries accessing at least one data repository using the respective connector for the accessed repository for mapping the query instruction to the corresponding repository command called for by the subquery, the respective connector established after determining the data repository based on the subquery;

isolating, for each established connector, query instructions and associated repository commands from the query instructions and associated repository commands of the other connectors established for the plurality of data repositories, each subquery in the plurality of subqueries including at least one query instruction;

computing, for each of the query instructions in the query plan, a corresponding repository command based on invoking the connector for performing the mapping of the query instruction to the associated repository command; and executing each corresponding repository command, for each of the query instructions in the query plan, the corresponding repository command for accessing the data repository based on the mapping.

\* \* \* \* \*